March 13, 1934.  C. E. BRADBURN  1,951,270
AIR CONDITIONING APPARATUS
Filed March 15, 1932  2 Sheets-Sheet 1
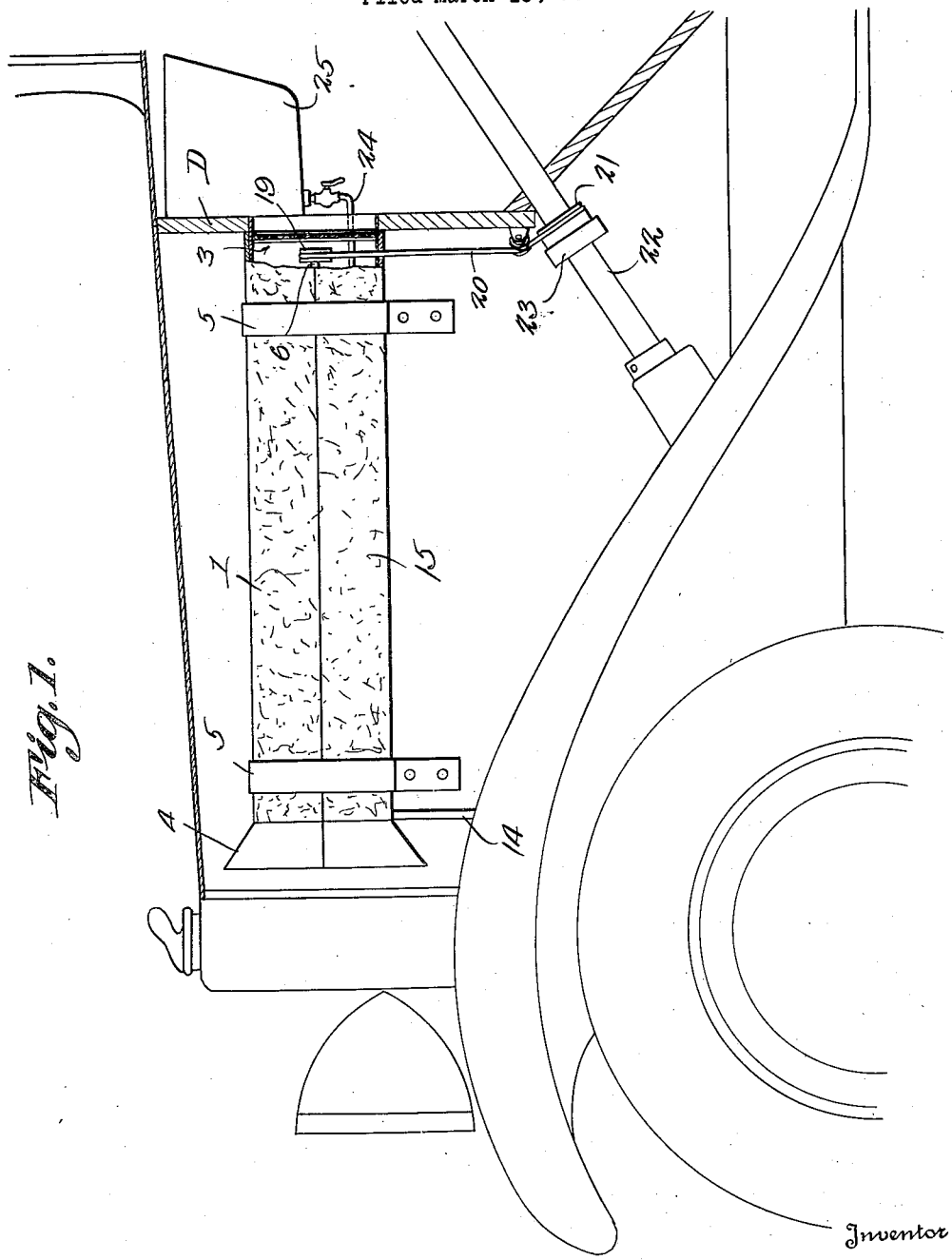
Inventor
C. E. Bradburn
By C. A. Snow & Co.
Attorneys.

March 13, 1934.    C. E. BRADBURN    1,951,270
AIR CONDITIONING APPARATUS
Filed March 15, 1932    2 Sheets-Sheet 2
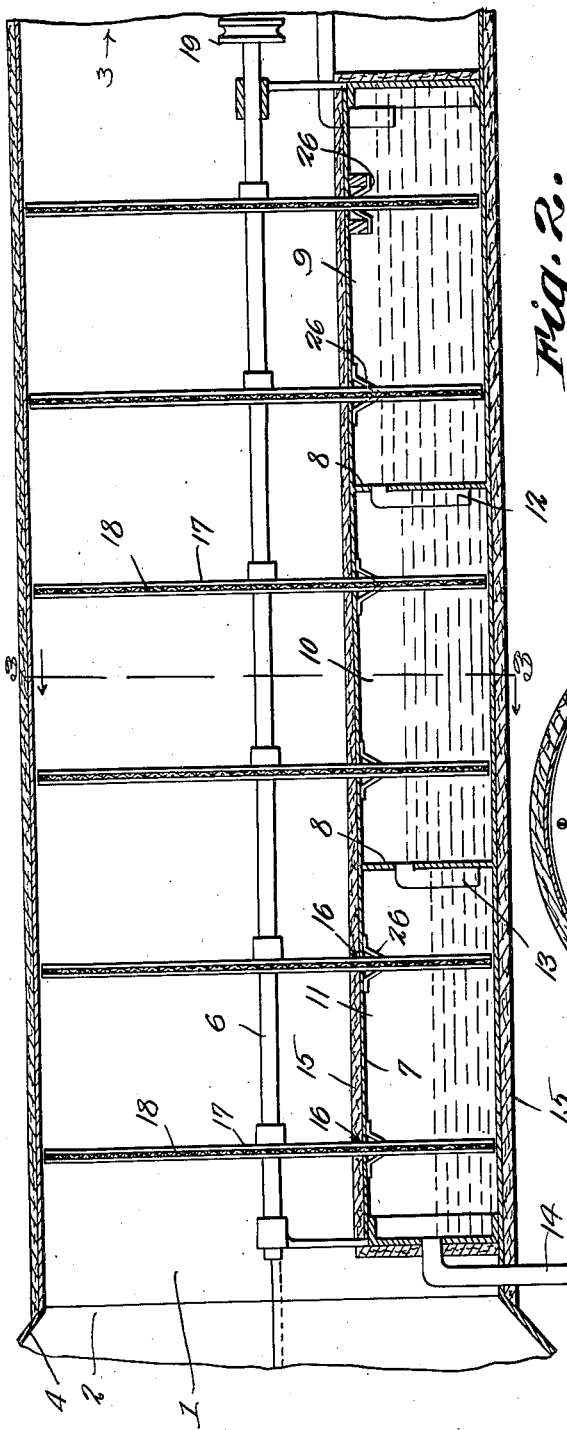
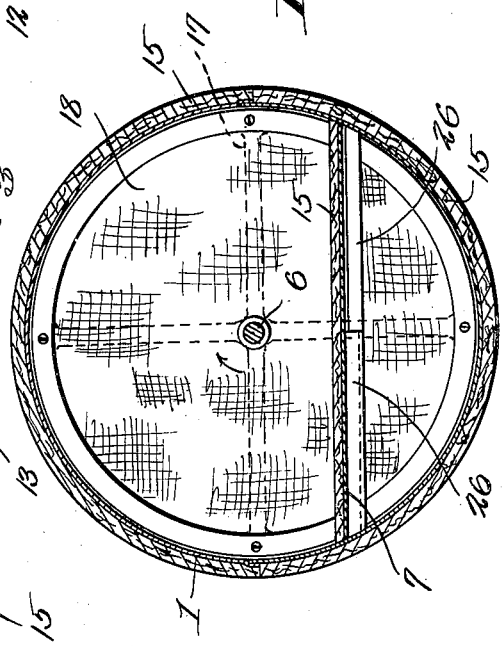
Inventor
C. E. Bradburn
By C. A. Snow & Co.
Attorneys.

Patented Mar. 13, 1934

1,951,270

UNITED STATES PATENT OFFICE 1,951,270

AIR CONDITIONING APPARATUS

Curtis E. Bradburn, Garden City, Kans., assignor of one-third to John L. Rogers and one-third to Charles F. Spidell, both of Abilene, Kans., and one-sixth to Paul A. Skinner and one-sixth to George W. Finnup, both of Garden City, Kans.

Application March 15, 1932, Serial No. 599,007

1 Claim. (Cl. 261—92)

This invention relates to air conditioning apparatus and is designed more especially as an improvement upon the structure disclosed in my co-pending application filed February 12, 1932, Ser. No. 592,632.

It is an object of the invention to simplify the construction of the apparatus and thereby reduce its cost, facilitate its installation, and reduce the power required to operate it properly.

With the foregoing and other objects in view which will appear as the description proceeds, the invention resides in the combination and arrangement of parts and in the details of construction hereinafter described and claimed it being understood that changes may be made in the precise embodiment of the invention herein disclosed without departing from the spirit of the invention.

In the accompanying drawings the preferred form of the invention has been shown.

In said drawings:

Figure 1 is a side elevation partly in section of a portion of a motor vehicle equipped with the present improvements.

Figure 2 is a vertical longitudinal section through the air conditioning apparatus.

Figure 3 is a section on line 3—3, Figure 2.

Referring to the figures by characters of reference, 1 designates a housing which is preferably cylindrical and has an inlet 2 at its forward end and an outlet 3 at its rear end. The forward end of the housing can be flared, as shown at 4, if desired.

The back end of the housing 1 can be extended into the dash D of a vehicle so that air flowing through the housing will thus be delivered into the body of the vehicle.

Housing 1 is split longitudinally into upper and lower sections which can be separated. Normally, however, these sections lap at their sides and are held together by any suitable means such as holding straps 5 or the like extending thereover.

A central longitudinal shaft 6 is extended within the housing 1 and the lower section of the housing is provided with a partition 7 extending horizontally. The space below this partition is divided by transverse upwardly extending partitions 8 into separate compartments 9, 10 and 11. An overflow pipe 12 or the like opens downwardly into compartment 10 from the upper portion of compartment 9 and another overflow pipe 13 or the like opens downwardly into compartment 11 from compartment 10. A third overflow pipe 14 opens downwardly from the upper portion of compartment 11. The upper or inlet ends of all of these pipes are located at different levels so that the level of fluid in compartment 9 is maintained above that in compartment 10 where the level, in turn, is above that in compartment 11.

Partition 7 and the housing 1 are heavily insulated as shown at 15 whereby the contents of the several compartments as well as the air flowing along the inside of the housing will be afforded maximum protection from the heat of the outside air.

Partition 7 constitutes the top of the several compartments 9, 10 and 11 and has transverse slots 16 opening into these compartments. Skeleton disks 17 are secured to shaft 6 so as to rotate therewith and each of these disks is covered with a coarse mesh absorbent material 18. The disks have their peripheries close to the inner surface of housing 1 and as they move within the respective compartments during the rotation of shaft 6 they will, of course, absorb moisture from the compartment and elevate it into the path of the stream of air flowing through housing 1 above partition 7.

Any suitable means can be used for rotating shaft 6. For example a pulley 19 can be secured thereto and a belt 20 used for driving the same from a pulley 21 mounted on the steering shaft 22. A suitable ratchet indicated generally at 23 can be used for transmitting motion from shaft 22 to pulley 21 whereby during the back and forth rotation of the steering shaft caused by the back and forth rotation of the steering wheel, the ratchet will act to impart an intermittent rotation in one direction only to pulley 21 and through belt 20 to pulley 19 and shaft 16.

A cooling medium such as cold water can be supplied to compartment 9 through a tube 24 from a container 25. Obviously the liquid in compartment 9 will be colder than that in compartment 10 while the contents of compartment 11 will be warmer than those of compartment 10. This is due to the fact that when the cooling medium enters compartment 11 it has already been subjected to the warming action of disks projecting into the other compartments and the contents of compartment 10 have been warmed by the overflow from compartment 9.

Obviously the air will be gradually cooled as it flows successively through the moisture-laden disks, passing from the warmest disks adjacent to the inlet to the coolest disks adjacent to the air outlet. Thus the action upon the air is the same as that disclosed in my application heretofore mentioned. It is to be understood, of course, that the slots 6 can be provided with sealing flaps 26 or the like to prevent direct contact of air from within the upper portion of housing with the contents of compartments 9, 10 and 11.

What is claimed is:

Air conditioning apparatus including a housing having an air inlet at one end and an air outlet at its other end, a transverse partition extending longitudinally within the housing and slotted transversely, vertical partitions between the bottom portion of the housing and the longitudinal partition dividing into separate compartments the space beneath the longitudinal partition, tubular connections between the compartments providing water seals and the sole means of communication between the compartments, a shaft axially disposed within the housing above the longitudinal partition and mounted for rotation, flat foraminous disks rotatable with the shaft and working within the respective slots, said disks extending close to the wall of the housing, means carried by the longitudinal partition for removing excess moisture from the surfaces of the disks prior to their emergence from the slots, and an insulating material covering the longitudinal partition and those portions of the housing constituting the outer walls of the compartments, thereby to protect the contents of the compartments from the action of air outside of the housing and above the longitudinal partition within the housing.

CURTIS E. BRADBURN.